United States Patent Office 3,715,344
Patented Feb. 6, 1973

3,715,344
REGULAR LINEAR HEAD-TO-TAIL POLYM-
ERIZATES OF CERTAIN UNSATURATED
HYDROCARBONS AND FILAMENTS COM-
PRISING SAID POLYMERIZATES
Giulio Natta, Piero Pino, and Giorgio Mazzanti, Milan,
Italy, assignors to Montecatini Edison S.p.A., Milan,
Italy
No Drawing. Filed June 8, 1955, Ser. No. 514,099
Claims priority, application Italy, June 8, 1954,
24,227/54; July 27, 1954, 25,109/54
Int. Cl. C08f 3/10
U.S. Cl. 260—93.7                                       4 Claims This invention relates to new, linear, regular head-to-tail polymers of unsaturated hydrocarbons of the formula $$CH_2=CHR$$

i.e., alpha-olefines, wherein R is a saturated aliphatic, an alicyclic, or an aromatic radical, copolymers of said unsaturated hydrocarbons with one another, and copolymers of the unsaturated hydrocarbons with at least one other monomer copolymerizable therewith.

The unsaturated hydrocarbons of the general formula as defined above are alpha-olefines in the broad sense, and are thus understood to comprise such derivatives as, for instance, styrene, R being the phenyl radical.

More particularly, the invention relates to high molecular weight crystalline polymers of the higher homologues and derivatives of ethylene as, for instance, propylene, butene-1, pentene-1, hexene-1, styrene and so on.

In the copending application Ser. No. 514,097 now Pat. No. 2,446,869, filed concurrently herewith by the same inventors, there is described and claimed a method for producing the polymers and copolymers of the alpha-olefines using, as polymerization aid a catalyst obtained by mixing a catalytic heavy metal compound such as titanium tetrachloride, and a catalytic metal alkyl compound such as aluminum triethyl, in a solvent inert to the polymers to be formed, such as a saturated aliphatic hydrocarbon, in a ratio such that the number of moles of the metal alkyl component is not more than ten times the number of moles of the heavy metal compound and is preferably less than five times the latter, as for instance, in a molar ratio of 10:1 to 3:1.

As described in said application Ser. No. 514,097 polymerization of the alpha-olefines can be accomplished by mixing an inert solvent solution of the catalytic heavy metal compound with an inert solvent solution of the catalytic metal alkyl component, adding at least one of the alpha-olefines, or a mixture thereof with another monomer such as ethylene, to the catalyst, and heating the mass to effect the polymerization.

In a specific embodiment of that method there may be used advantageously, as the metal alkyl component, a compound in which the alkyl radicals contain the same number of carbon atoms as the alpha-olefine to be polymerized. For example, the polymerization of propylene is carried out with the aid of a catalyst prepared by mixing an inert solvent solution of tripropyl aluminum with an inert solvent solution of titanium tetrachloride. Higher polymerization rates and increased yields of the polypropylene are thus obtained.

In another modification of the described polymerization method, the alpha olefines or mixtures containing them are polymerized by preparing the catalyst from the catalytic heavy metal compound and the catalytic metal alkyl component in the presence of an olefine, most desirably the alpha-olefine to be polymerized. Or the metal alkyl component and the alpha olefine, or polymerizable mixture are first brought together, and the heavy metal compound is then added thereto.

The present application is concerned with the alpha-olefine polymers and copolymers obtained by the above-mentioned methods, which products are claimed herein.

These products are, initially, mixtures of linear head-to-tail polymers having no branches longer than R, which mixtures comprise, mainly, amorphous and crystalline polymers which can be separated by fractional dissolution. Thus, in the case of poly-propylene for example, after removal of some oily, low-molecular products, soluble in acetone and usually present in the polymerizate in only small amounts, there may be obtained, by successive extraction of the polymerizate with acetone, ether, and n-heptane, semi-solid to solid amorphous polymers, solid, partially crystalline polymers of higher molecular weight, and highly crystalline polymers of very high molecular weight, having fiber-forming properties. The high molecular weight, highly crystalline polymers may comprise 30 to 55% of the total polymer mixture.

These polymers, depending on their steric structure and molecular weight, exhibit very different characteristics. The amorphous polymers have viscous elastic properties which lie between those of a highly viscous liquid and those of an unvulcanized, non-crystallizable elastomer, while the solid, highly crystalline polymers, which can be oriented by drawing, are fiber-forming.

Both the amorphous and crystalline polymers are linear, as shown by their infrared spectra. In the case of the propylene polymers of the invention, for example, both the amorphous polymers and the crystalline polymers have similar infrared spectra which are completely different from the infrared spectra of the known branched polypropylene, i.e. polypropylene in which the branches are longer than R.

The differences in the properties of our two types of polymers must be attributed to a different distribution, along the main chain, of those asymmetric carbon atoms having the same steric configuration.

According to Flory (Principles of Polymer Chemistry, 1953, pp. 55–56, 237–238) a vinyl polymer containing asymmetric carbon atoms as, for example

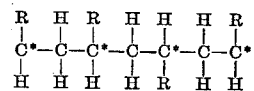

may be considered as a copolymer of two different monomer units

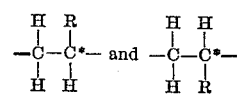

in one of which the asymmetric carbon atom (C*) has an l-configuration, and in the other a d-configuration.

When such monomer units containing an asymmetric carbon atom showing a l- or d-configuration recur statistically along the polymer chain, as is generally the case in all of the previously known vinyl polymers, the polymer may be considered as a copolymer of the two types of structural units and, therefore, if the substituent R is much larger than a hydrogen atom, the polymer is substantially non-crystalline and does not show any first order transition point.

Prior to this invention, the only vinyl polymers known to exist in both an amorphous and in a highly crystalline form were the polyvinyl ethers prepared by Schildknecht and co-workers (Ind. Eng. Chem. 40 (1948) p. 2104; ibid. 41 (1949) pp. 1998, 2891).

In contrast to the structure of the known polymers as illustrated above, our polymers are not copolymers in the sense of Flory, but have a high degree of crystallinity because, apparently at least for long portions of the main chain, all of the asymmetric C atoms have the same steric configuration.

The structure of our new crystalline high molecular weight polymers of the alpha-olefines was determined from X-ray data on drawn fibers of the polymers.

The dimensions of the elementary cell for different alpha-olefine polymers were measured by us and are shown in Table I below.

TABLE I

| Polymer | Identity period along the chain axis, A. | X-ray Melting point, °C. | X-ray Density | Density by weight |
|---|---|---|---|---|
| Polypropylene | 6.50±0.05 | 160 | 0.94 | 0.92 |
| Poly-alpha butene | 6.70±0.1 | 125 | 0.96 | 0.91 |
| Poly-alpha pentene | 6.60±0.1 | 75 | | 0.87 |
| Polystyrene | 6.65±0.05 | 230 | 1.12 | 1.08 |

NOTE—The X-rays densities were calculated for polystyrene and polybutylene on the basis of an hexagonal cell (Space-group R3c or R3̄c having, respectively, $a$=21.9 A. for polystyrene and 17.3 A. for polybutene. The cell contains 6 chain portions containing each 3 monomeric units. As no sufficient data are available to establish the correct unit cell of polypropylene, the X-ray density for this polymer was calculated by indexing the equatorial X-ray reflections on the basis of an oblique cell with $a$=6.56 A, $b$=5.46 A., $\gamma$=106°.30', and considering the identity period along the fiber axis $c$=6.5 A.

From the above it is clearly apparent that the identity period along the fiber axis is, and all cases, in the range of 6.5–6.7 A.

By comparing X-ray and density data, it may be seen that each stretch of principal chain included in the elementary cell corresponds to 3 monomeric units

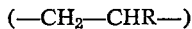

and that, therefore, a regular succession of monomeric units having alternating $d$ and $l$ asymmetric carbon atoms can be excluded. Among all possible remaining regular successions of $d$ and $l$ asymmetric carbon which could lead to a crystalline polymer, it is believed, on the basis of the X-ray data, that the most probable is the one in which, at least for long portions of the main chain, all the asymmetric C atoms have the same steric configuration:

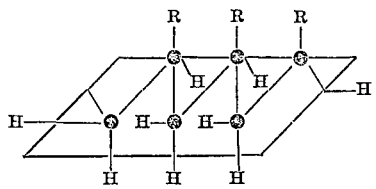

(Model of a portion of the main chain of a crystalline poly-alpha-olefine according to the present invention, arbitrarily fully extended in a plane, in which the R substituents on the tertiary C atoms are all above and their H atoms below the plane of the chain.)

hindrance of the substituent groups. R in the crystalline state, the main chain must therefore assume a non-planar conformation. We have found this conformation to be spiral-like.

The hypothesis of a coiled conformation of the main chain in the crystalline state agrees with the value of the identity period along the same chain (6.5–6.7 A.) which is smaller than the length of the planar, fully extended structure (7.62 A. for 3 monomeric units).

Our linear, regular head-to-tail macromolecules having substantially no branches longer than R and the main chain of which has substantially a structure of the kind illustrated in the model (isotactic structure) are recognized in the art (following us) as "isotactic" macromolecules, whereas our macromolecules having substantially no branches longer than R and in which the asymmetric carbon atoms of the two possible steric configurations have a substantially random distribution along the main chain, are recognized in the art (following us) as "linear, regular head-to-tail atactic" macromolecules. The term "isotactic" was originated by one of us (G. Natta) for indentifying the structure of the kind shown in the model, the macromolecules having substantially that kind of structure, and polymers consisting of these macromolecules substantially having that kind of structure, and is used herein for convenience and conciseness. (See, for example, the Natta et al. communication to the editor of Journal American Chemical Society, published in said journal on Mar. 20, 1955, received for publication Dec. 10, 1954; and the Natta article published in the Journal of Polymer Science, April 1955, vol. XIV, issue No. 82, pp. 143–154, received for publication on Feb. 17, 1955.)

The isotactic structure imparts to the new products properties not previously known for any polymer of an unsaturated hydrocarbon of our type.

In fact those of our polymers having a high molecular weight are, at room temperature, crystalline solids very different, e.g. from the elastomers obtained by known methods from isobutylene, which are crystallizable under stress and show a spiral-like linear chain, but with a different identity period. The known polyisobutylene, in non-stretched condition, is crystalline only below room temperature, whereas the crystalline polypropylene, for example of this invention, only loses its crystallinity at temperatures above 150° C.

The substantial differences in the physical properties of the two types of polymers which we have prepared, are summarized in the following Table 2.

TABLE 2

| Polymer | 1st order transition temp., °C.[1] | 2d order transition temp., °C. | Measured density | Solubility in boiling— Acetone | Ethyl acetate | Ethyl ether | n-Heptane | Toluene |
|---|---|---|---|---|---|---|---|---|
| Commercial polyethylene | 100–130 | | 0.92 | i. | i. | i. | S.S. | S |
| Crystalline polypropylene | 155–165 | | 0.85 | i. | i. | i. | S. | V.S. |
| Amorphous polypropylene | | <(−70) | 0.91 | S.S. | S.S. | S. | S. | V.S. |
| Crystalline polyalphabutene | 120–130 | | 0.87 | i. | i. | i. | S. | V.S. |
| Amorphous polyalphabutene | | | 0.87 | S.S. | S.S. | S. | V.S. | V.S. |
| Crystalline polyalphapentene | 70–80 | | | i. | i. | S.S. | S. | V.S. |
| Amorphous polyalphapentene | | | | S.S. | S.S. | S. | V.S. | V.S. |
| Crystalline polystyrene | 210–230 | | 1.08 | i. | i. | i. | i. | S. |
| Amorphous polystyrene | | 80–90 | 1.05 | S.S. | S.S. | S. | S. | V.S. |
| Crystalline polyalphahexene | <20 | | | | | | | |

[1] Rontgenographic melting point.

NOTE.—i.=insoluble; S.=soluble; V.S.=very soluble; S.S.=slightly soluble.

In this case the stable existence of a planar fully extended paraffinic chain is most unlikely owing to the steric The very remarkable differences in the solubilities of the two types of polymers, amorphous and crystalline, permit of their ready separation by extraction with suitable solvents.

For a given polymeric mixture according to the invention, the crystalline polymers are always less soluble than the amorphous polymers, independently of the molecular weight. The solubilities of polymers of the same type (i.e., amorphous or crystalline) but of different molecular weight decrease slightly and gradually with increase in the molecular weight.

For example, when that portion of the polypropylene polymer described in Example I below, which can be extracted with ether (intrinsic viscosity=1) is examined under the X-rays, it appears wholly amorphous and has, usually, a molecular weight of up to about 45,000. This fraction changes from amorphous solid (very highly viscous liquid) to a flowing liquid at about 135° C. The portion extracted in boiling n-heptane (intrinsic viscosity=1.2–1.3; average molecular weight 45,000–55,000) already shows considerable crystallinity under the X-rays and melts completely at about 150° C.

The polymers insoluble in boiling n-heptane have a higher molecular weight, above 100,000 (intrinsic viscosity above 3) and are solids having a melting point of about 160° C. and a density (calculated from reticular distances determined from X-ray diffraction patterns of fibers of the polymers) between 0.90 and 0.94, as compared to a density of about 0.94 as the upper limit for a completely crystalline polymer. The density is lowered by the presence of an amorphous portion and, in fact, the amorphous ether-soluble polypropylenes have a density lower than 0.90. The propylene polymers insoluble in boling n-heptane are, therefore, highly crystalline. Above the transition temperature at which the crystalline state disappears, the highly crystalline polypropylenes do not change directly into a flowing liquid, but retain the characteristics of an amorphous plastic substance. Therefore, those polymers can be readily processed at a temperature somewhat higher than the temperature at which the crystalline structure completely disappears, by methods commonly used for the extrusion and injection molding of plastic masses. Moreover, we have found, as will be described in greater detail hereinbelow, that those polypropylenes of very high molecular weight (intrinsic viscosity above 3) and having a high degree of crystallinity which persists up to relatively high temperatures (above 150° C.) such as are described in Example I, exhibit surprising mechanical properties not exhibited by any polymerized hydrocarbon known heretofore and which render the polymers useful for the production of very valuable textile fibers.

The high molecular weight polymers of aliphatic hydrocarbons or alpha-olefines of the invention, in suitably purified condition, may be molded at suitable temperature to obtain plates or sheets which are transparent. The plates or sheets may be cold-stretched up to about 700%. The breaking load, referred to the section resulting after stretching, may be very high. For instance, the high molecular weight polymer of Example II has, after cold-stretching, a breaking load higher than 30 kg./sq. mm. The breaking load may be even higher, if the polymer is drawn into thin filaments. The filaments obtained by extrusion of the high molecular weight polymers through a spinneret and stretching of the filament have a silk-like appearance and mechanical properties (high breaking load and high elongation before rupture of the stretched filament) which make them particularly suitable for use in the textile field.

It is not necessary to separate the amorphous polymers from the crystalline polymers before producing shaped articles such as filaments, sheets, foils, etc. In fact, it may be preferred, at least in some instances, to mold the polymerizate comprising the amorphous and crystalline polymers to the desired shape, and then remove the amorphous polymers from the shaped object by treating it with a solvent for the amorphous polymers which does not dissolve or appreciably swell the crystalline polymers. For example, in producing filaments, the amorphous polymers of lower molecular weight serve as plasticizers for the crystalline polymers and, by lowering the viscosity of the mass, permit extrusion thereof at lower temperatures and pressures. The plasticizing amorphous polymers also facilitate orientation of the molecules during drawing of the extruded filaments.

Thus, the polymerizate comprising the amorphous and crystalline polymers may be converted by heat to a soft, plastic or even molten mass, extruded through a spinneret to form filaments which, are treated with a solvent, for instance ethyl ether in the case of polypropylene, for the amorphous polymers which are thus dissolved out, leaving filaments consisting of the higher molecular weight, crystalline polymers. In this manner, filaments having in some cases breaking loads higher than 70 kg./sq. mm., referred to the section at break, may be obtained.

The strongly stretched filaments show unusually high values for the reversible elongation (elasticity) as well as other similarities to wool. Compared with wool, filaments of the polypropylenes of the invention possess improved mechanical properties. It is to be noted that the polypropylenes of the invention exhibit a very interesting behavior on stretching thereof. Extruded filaments of highly crystalline polypropylene may not exhibit by further stretching a yield point corresponding to a maximum in the strain-elongation plot. Sheets of our polypropylene are adapted to use for all those purposes for which mechanical properties better than those of commonly available polyethylene are needed, and chiefly for purposes for which flexible sheets of increased elasticity are desired.

Table 3 gives comparative data for polypropylene according to this invention (highly crystalline polymer, Example 1) and a typical polyethylene (commercial product of Imperial Chemical Industries, Ltd.).

TABLE 3

| | Polypropylene | Polyethylene ICI |
|---|---|---|
| Roentgenographic melting point, ° C.[1] | 150–160 | 90–120 |
| Crystallinity (estimated from X-ray data), percent | >90 | 40–60 |
| Structure | Linear | Branched |
| Breaking load of oriented fibers, kg./mm.[2] | 30–80 | 10–20 |

[1] Temperature at which crystalline structure, as detectable by X-rays analysis, disappears.

The amorphous polypropylenes of the invention have viscous-elastic properties. The viscosity of these polymers increases with increase in the molecular weight. The amorphous polymers have a 2nd order transition temperature lower than −70° C. The polymers of very low molecular weight (up to a few thousand) occur as viscous liquids, with a very high viscosity index. The polymers of higher molecular weight even higher than 30,000–40,000, still exhibit viscous properties and, therefore, are not true elastomers.

The following examples are given to illustrate preferred embodiments of the invention, it being understood that these examples are not intended as limitative. The average molecular weights of the products were estimated from specific viscosity measurements in tetrahydronaphthalene solutions at a polymer concentration of 0.1 gm. per 100 gms. of solvent, and from intrinsic viscosity measurements. Specific viscosity is the viscosity of the solution less the viscosity of the solvent, divided by the viscosity of the solvent. By "intrinsic viscosity" is meant the limit of the ratio between the specific viscosity and concentration, for concentrations tending to zero:

(limit $C \rightarrow 0 \ \frac{\eta \text{ spec}}{C}$, where C is the concentration of the solution in gms./cc.)

In this manner it was estimated that the average molecular weight of the solid amorphous and crystalline polymers of the invention is usually above 20,000. Polymers having an average molecular weight above 2,000 and up to 100,000 or higher may be obtained.

EXAMPLE I

A solution of 1.8 gms. of titanium tetrachloride in 50 ml. of anhydrous gasoline (B.P. 98° C.) is added dropwise, at a temperature slightly lower than room temperature (5°–10° C.) to a solution of 11.4 gms. of triethyl aluminum in 150 ml. of the gasoline. The solution is further diluted to 500 ml. with gasoline and introduced into an oscillating dried and evacuated stainless steel autoclave of about 2 liters capacity. 190 gms. of liquid carefully dried propylene are then pumped into the autoclave and heated, while agitated, to about 55–60° C. After the pressure has fallen from the initial value of about 10 atm. to about 2 atm., an additional 160 gms. of propylene are added. The pressure thereafter falls at a lower rate and after about 20 hours no further decrease in pressure is observed. The residual gases are then vented, and consist chiefly of propylene (72.5 normal liters) and a small amount (0.2 N liters) of ethylene which probably results from decomposition of the catalyst. 95 gms. of methanol are then pumped into the autoclave to decompose the catalyst. 5.7 N liters of gas are evolved, more than 50% of which is propylene. The polymerization product comprising a solid mass drenched with gasoline and methanol is then extracted from the autoclave. It is suspended in diisopropyl ether and the suspension is heated under strong stirring and while bubbling through gaseous HCl, to render all inorganic compounds resulting from decomposition of the catalyst soluble. After four hours, a little methanol is added to the suspension to precipitate the polymer which may have been dissolved and the suspension is filtered under suction. The solid product thus obtained, after drying at 100° C. under reduced pressure, weighs 180 gms. and has an ash content of 0.22%. It is a white, spongy solid comprising a mixture of propylene polymers of a wide range of molecular weigths, has a transparent, rubber-like appearance at 140° C., and definitely melts at 155° C. This mixture of propylene polymers can be molded at 130° C. to flexible sheets containing amorphous and crystalline portions, as shown by X-ray diffraction pattern.

A few grams of a very viscous oil are recovered from the filtered liquid, after distillation of the solvent.

The solid propylene polymer mixture can be separated into a small amount of oily, low molecular weight products and several larger fractions of amorphous and crystalline products by fractional dissolution using, successively, boiling acetone, ethyl ether and n-heptane. The fractionation is conducted in an extractor of the Kumagawa type and the extraction with each solvent is continued until the percolating solvent does not contain any appreciable quantity of extracted polymer.

The acetone-extracted fraction (A) consists of the oily, low molecular weight products and amounts to only 2.8% of the solid polymer obtained.

The ether extracted fraction (B) amounts to 39% of the total polymer, and after evaporation of the solvent under vacuum (intrinsic viscosity=1) is completely amorphous similarly to an unvulcanized elastomer.

The n-heptane extracted fraction (C) amounting to 19% of the total polymer, has, after evaporation of the solvent under vacuum, an intrinsic viscosity of 1.2–1.3 and is, at room temperature, a partially crystalline solid which melts completely at 150° C., and which also has the properties of an elastomer but up to temperatures higher than the temperatures at which fraction (B) shows the elastomer-like properties.

The residue (D) insoluble in all three of the extracting solvents, has a density of about 0.92 and an intrinsic viscosity, determined in tetrahydronaphthalene solution, of 3.33 (100 ml./g.) A 1% solution in tetralin has a specific viscosity of 0.374. This fraction (D) undergoes synersis starting at 120° C. loses its crystallinity above 150° C., and at 170° C. is wholly converted into a transparent, very viscous mass.

By molding fraction (D) in a flat press at 140–150° C., plates or sheets are obtained which appear crystalline under the X-rays, show a 700 elongation, and a breaking load of 350 kg./sq. cm. referred to the original section.

Fraction (D) can be formed into filaments or threads by extruding the same, in softened condition, through a spinneret and then either warm- or cold-stretching the extruded filament. The stretched filament is highly crystalline and has a very high breaking load. Thus, a cold-stretched thread of this polymer having a diameter of 0.3 mm. after stretching has, for instance, a breaking load of 32 kg./sq. mm. and an elongation of 40.

The residue of the extraction with ether has similar characteristics with, however, a lower tensile strength. The properties of said residue are intermediate those of the n-heptane extract and those of the n-heptane residue.

EXAMPLE II

To a solution of 7.8 gms. of tripropyl aluminum in 70 ccs. of heptane are added, dropwise at 0° C. and under nitrogen, 1.9 gms. of titanium tetrachloride dissolved in 25 ccs. of heptane. The suspension is diluted to 200 ccs. with heptane and introduced under nitrogen into a 435 ccs. autoclave. After 102 gms. of propylene have been added, the autoclave is heated, with stirring of the contents, to 60° C. and is kept for about 40 hours at between 60° C. and about 68° C. The unreacted gases are then vented and 50 ccs. of methanol are pumped into the autoclave.

The coagulated polymerizate thus obtained is purified as in Example I, and 17.2 gms. of solid polymeric material are obtained and fractionated by hot solvent extraction.

The acetone-extracted fraction, A (27.6% of the total polymer) consists of semi-solid products of low molecular weight.

The ether extracted fraction B (26.9% of the total) consists of a solid product of gummy appearance having an intrinsic viscosity of 1.57 corresponding to an average molecular weight of about 63,000. This fraction, which comprises a mixture of polymers, is amorphous under the X-rays.

The heptane extracted fraction, C, amounting to 15.1% of the total polymer, consists of partially crystalline polypropylene having an intrinsic viscosity of 2.35 corresponding to a molecular weight of approximately 120,000. The extraction residue is formed by highly crystalline polypropylene having an intrinsic viscosity of 5.1 (molecular weight approximately 390,000).

The crude polymer mixture can be easily oriented by hot drawing. Thus, without separating the amorphous portions of lower molecular weight, the mixture of polymers may be softened and extruded to fibers which, after cold-stretching, exhibit good mechanical properties.

EXAMPLE III

About 530 ml. of gasoline containing 15.6 gms. of tripropyl aluminum and 275 gms. of propylene are introduced into a 2150 ml. autoclave. The autoclave is heated to 70° C., and a solution of 3.6 gms. of titanium tetrachloride in gasoline is added. The temperature rises spontaneously to 95° C. After the temperature has dropped back to 80° C. 1.8 gms. of titanium tetrachloride are added. The autoclave is then agitated for four hours while maintaining the temperature at 80° C. By operating as in Example I, 209 gms. of solid polymer are obtained. The yield is 76% based on the introduced propylene; higher than 95% based on converted propylene.

The acetone extracted fraction (A) amounting to 7.1% of the total polymer consists of oily, low molecular weight products, The ether extracted fraction (B) amounts to 32.4% of the total polymer and consists of a rubbery, amorphous solid having an intrinsic viscosity of 0.9.

The heptane-extracted fraction (C) amounting to 19.1% of the total polymer consists of a partially crystalline solid having an intrinsic viscosity of 0.95.

The residue of the three solvent extractions (fraction D) amounts to 41.4% of the total polymer and consists of a powdery solid which appears highly crystalline when examined under the X-rays and has an intrinsic viscosity of 4.6 and becomes soft at about 180° C.

Continuous filaments obtained by extruding the crude (total) polymer of this example through a spinneret at 170–200° C. exhibit mechanical properties which depend on the extent of stretching of the filaments and on the filament diameter. Table 4 below gives the values found for filaments obtained by extruding the unfractionated polymer under nitrogen at a pressure of 1–2 atm.

TABLE 4

| | Percent cold stretching | Breaking load referred to the initial section, kg./sq. mm. | Elongation at break, percent |
|---|---|---|---|
| Filament diameter: | | | |
| 0.5 mm | 0 | 2.3 | 520 |
| 0.2 mm [1] | 400 | 30.0 | 50 |

[1] After cold stretching.

Table 5 gives the properties of filaments obtained by extruding the unfractionated polymer of this example under the conditions described above and then removing the amorphous polymer portions from the formed filaments by passing them through a solvent such as ethyl ether which removes the amorphous portions without any appreciable swelling of the crystalline portions.

TABLE 5

| Percent elongation by cold stretching | Filament diameter, mm. | Breaking load referred to the initial section, kg./sq. mm. | Elongation at break (percent) |
|---|---|---|---|
| 0 | 0.6 | 3.5 | 470 |
| 150 | 0.25 | 20.5 | 130 |
| 0 | 0.1 | 12.7 | 500 |
| 300 | 0.05 | 52.0 | 50 |

EXAMPLE IV 160 ml. of gasoline containing 5.7 gms. of triethyl aluminum, and 85 gms. of butene-1 (Philips Petroleum Co. technical grade) are introduced into a 435 ml. autoclave. The autoclave is heated to 81° C., and 1.8 gms. of titanium tetrachloride dissolved in 35 ml. of gasoline are added. The temperature increases spontaneously to some degree. After about one hour, a further quantity of titanium tetrachloride dissolved in gasoline is added. A spontaneous temperature increase of about 10° C. occurs. The autoclave is agitated for some hours at 90–98° C.

Operating as in the preceding examples, 10 gms. of a white solid polymeric product are obtained. This product softens at 110° C. and appears crystalline under the X-rays. The residue of the extraction with ether corresponds to 46% of the total polymer and has an intrinsic viscosity of 1.44 ml./gm. calculated from measurements similar to those used in Example I.

EXAMPLE V 400 ml. of gasoline containing 11.4 gms. of triethyl aluminum, and 291 gms. of a butene-2-/butene-1 mixture (with 70% of butene-1) are introduced into a 2150 ml. autoclave. The autoclave is then heated to 71° C. and 3.6 gms. of titanium tetrachloride dissolved in gasoline are added; the temperature rises to 77° C. After two hours a further addition of 3.6 gms. of titanium tetrachloride is made. The autoclave is kept in agitation for some hours at temperatures in the range 80–85° C. Operating as in the foregoing examples, 86 gms. of white solid product are obtained. This product has characteristics similar to those described in Example IV, and softens at 125° C. Fibers are readily obtained from this product by extrusion through a spinneret under nitrogen pressure at temperatures above the softening point. The fibers have a mechanical strength of the same order as the fibers obtained from polypropylene but a higher elasticity.

EXAMPLE VI 25 gms. of hexene-1, dissolved in 29 gms. of hexane, containing 5.7 gms. of triethyl aluminum, are heated under reflux in a 500 ml. flask fitted with a stirrer, under nitrogen atmosphere. 1.8 gms. of titanium tetrachloride dissolved in hexane are then added and the mixture is allowed to boil under reflux for 5 hours. The obtained solution is treated, after cooling, with methanol, then with diluted hydrochloric acid, and finally evaporated to dryness.

The formed polymer corresponds to a conversion of the starting hexene-1 higher than 50%. This polymeric material is soluble in gasoline and ether, only slightly soluble in methanol. The portion insoluble in methanol has very marked viscous elastic properties.

EXAMPLE VII 45 gms. of pentene-1 and a solution of 5.7 gms. of triethyl aluminum in 250 ml. of heptane are introduced under nitrogen into a 500 ml. flask fitted with a mechanical stirrer, a dropping funnel and a refluxing condenser. The whole is heated to 50° C. and at this temperature a solution of 3.8 gms. of titanium tetrachloride in 20 ml. of n-heptane is dropped into the flask. A spontaneous increase of the temperature up to 70° C. is at once observed. The mass is agitated for 3 hours at this temperature, then the organo-metallic compounds present are decomposed with methanol. The polymer obtained is purified as described in the preceding examples. 16.5 gms. of polymer are thus obtained, which are extracted with boiling solvents.

The acetone extracted fraction (A) amounting to 47.8% of the total polymer consists of oily products.

A fraction (B) obtained by extraction with ethyl acetate corresponds to 44.3% of the total polymer and consists of a rubbery, amorphous solid product.

An ether extracted fraction (C) corresponds to 7.9% of the total polymer and consists of a solid polypentene which appears highly crystalline when examined under the X-rays.

EXAMPLE VIII

A solution of 11.4 gms. of triethyl aluminum in 400 ml. of n-heptane and 250 gms. of monomeric styrene are introduced under nitrogen into a 2150 ml. autoclave. The autoclave is heated to 68° C. and at this temperature a solution of titanium tetrachloride in 50 ml. of heptane is injected under nitrogen into the autoclave. After 3 hours, during which period of time the temperature is kept between 68 and 70° C., a solution of 3.8 gms. of titanium tetrachloride in 50 ml. of heptane is injected into the autoclave. Six hours after the first addition of titanium tetrachloride, 100 ml. of methanol are pumped into the autoclave and then the reaction product is discharged. It is a viscous liquid containing in suspension a fine powder.

The reaction mass is then treated with hydrochloric acid to dissolve the inorganic products present. By the addition of a large quantity of methanol a polymer coagulates; this polymer is filtered off and treated with acetone which is acid due to the presence of hydrochloric acid. In this way the amorphous polystyrene and the inorganic impurities, which are still present, are dissolved.

Th residue which remains after the treatment with acetone is vacuum dried at 80° C.; 30 gms. of polystyrene consisting of a white powder, which appears highly crystalline when examined under the X-rays, are thus obtained.

The crystalline polystyrene obtained has a molecular weight of about 2,800,000 (as calculated from viscosimetric measurements in benzene at 25° C.), a density of 1.08 and a first-order transition point higher than 210° C.

The solvents employed in the purification and polymerization are then vacuum concentrated, with heating, to a small volume and finally treated with methanol. The amorphous polymer is thus precipitated. This polymer is isolated by filtration and vacuum dried under heating. 50 gms. of a solid, amorphous polymer, having a molecular weight of about 10,000, are thus obtained.

The crystalline polystyrene can be easily processed by pressing or extruding only at temperatures higher than the Rontgenographic melting point (1st order transition point) of about 230°. It can be oriented by drawing below this temperature.

EXAMPLE IX

A solution of 114 gms. triethyl aluminum in 500 ml. of gasoline is introduced in a 2150 cc. autoclave. 267 gms. of propylene are then added and the autoclave is heated to 68° C.; then a solution of 6.8 gms. of isoprene in 100 ml. gasoline is introduced into the autoclave. Soon afterwards 3.6 gms. of titanium tetrachloride in 50 ml. gasoline are added. A temperature increase of about 10° C. is noticed. Two further additions of titanium tetrachloride are then made. About six hours after initiation of the reaction, the catalyst is decomposed with 100 gms. of methanol and the residual gases are released. The polymer obtained is purified as in Example I; 225 gms. of a white solid polymeric product are obtained, with a conversion of 82% on the total olefines present. The product absorbs bromine; it has a lower crystallinity than the polymers obtained under the same conditions from propylene alone.

EXAMPLE X 91 gms. of styrene and 11.4 gms. of triethyl-aluminum dissolved in 500 cc. of n-heptane are introduced into a 2150 cc. autoclave. 282 gms. of propylene are then added and the autoclave is heated to 62° C. At this temperature 3.8 gms. of TiCl$_4$ dissolved in 40 cc. of heptane are injected into the autoclave under nitrogen pressure. The temperature rises spontaneously to 100° C., and falls then slowly to 72° C. At this point a second addition of 3.8 gms. of TiCl$_4$ in 40 heptane is made. After about 6 hours from the beginning of the run the unreacted gases are vented and 24 normal liters of propylene are recovered. Methanol is now pumped into the autoclave and the coagulated polymer obtained is purified in the usual way.

299 gms. of a solid, white polymer are obtained, which is fractionally extracted with boiling acetone, ethyl ether and n-heptane, in succession. The acetone extracted fraction (A) corresponds to 14.6% of the total polymer and consists of oily products of low molecular weight. The ether extracted fraction (B) is 32.8% of the total polymer, and is a solid, amorphous product of rubber-like appearance. The n-heptane extracted fraction (C), 19.8% of the total, is a solid which becomes plastic at 90° C. The extraction residue, 32.8% of the total obtained polymer, is a powdery solid having, by X-rays analysis, a content of crystalline polypropylene.

The U.V. spectra of n-heptane solutions of the fractions obtained by extraction with ether and n-heptane indicate the presence of aromatic rings. The ether and n-heptane extracts contain therefore a copolymer propylene-styrene.

In Table 6 the extraction behaviour of the propylene-styrene copolymer of this example is compared to the behaviour of propylene and styrene polymers obtained under similar conditions. When the product of polymerization of a mixture of propylene and styrene is extracted with boiling solvents, a fraction insoluble in acetone and soluble in ether and a second fraction insoluble in both acetone and ether but soluble in n-heptane are obtained, whereas the polymer of styrene obtained with the same catalyst, if amorphous, is completely soluble in acetone and if crystalline is completely insoluble in all three solvents. The U.V. spectra of the soluble fractions show a considerable content of phenyl groups.

TABLE 6

| Polymer | Percent extracted by treating in succession with boiling— | | | |
|---|---|---|---|---|
| | Acetone | Ethyl ether | n-Heptane | Residue |
| Polypropylene | 7.9 | 40.5 | 24.4 | 27.2 |
| Polystyrene | 69 | 0 | 0 | 31 |
| Copolymer propylene-styrene | 15 | 32.6 | 19.8 | 32.6 |

EXAMPLE XI

About 500 ml. of gasoline containing 12 gms. of diethyl aluminum monochloride and 310 gms. of propylene are introduced into a 2150 ml. autoclave which is heated to 60° C. Two portions (3.6 gms. and 1.8 gms. respectively) of titanium tetrachloride dissolved in gasoline are added. The reaction proceeds as described in the foregoing examples.

The reaction product consists of 248 gms. of solid, white polypropylene. (Yield: 80% on the introduced propylene; about 95% on the converted propylene).

The acetone-extracted fraction (A) consists of oily products and amounts to 15% of the total polymer obtained.

The ether-extracted fraction (B) is a rubbery amorphous solid having an intrinsic viscosity of 0.4 and amounting to 44% of the total polymer.

The heptane-extracted fraction (C) amounting to 16.4% of the crude polypropylene consists of a partially crystalline solid having an intrinsic viscosity of 0.78.

The residue of the solvent extractions, fraction (D), amounts to 14.4% of the total crude polymer, has an intrinsic viscosity of 1.53 and appears highly crystalline on X-ray examination.

EXAMPLE XII

A solution of 11.4 gms. of triethyl aluminum in 500 ml. of gasoline and 320 gms. of a mixture of propylene and propane containing 15% propane are introduced into a 2150 autoclave. The mixture is heated to 71° C. and 3.6 gms. of titanium tetrachloride dissolved in 50 ml. of gasoline are added. The temperature rises spontaneously to 108° C., then decreases slowly. After about one hour, 1.8 gms. of titanium tetrachloride dissolved in gasoline are added and a further, smaller increase in the temperature occurs. About three hours after the first addition of titanium tetrachloride, methanol is admitted into the autoclave and the unreacted gases are released. The reaction product, purified as in Example I, consists of 200 gms. of a solid white polymer. Yield: 73% on the introduced propylene and 93% on the converted propylene. The properties of the product are practically identical with those of the polymer obtained from pure propylene.

EXAMPLE XIII 110 ml. of gasoline containing 5.7 gms. of triethyl aluminum, and 97 gms. of propylene are introduced into a 435 ml. autoclave. The autoclave is then heated to 62° C. and 3.6 gms. of chromium acetylacetonate dissolved in 50 ml. of anhydrous benzene are added. A slight spontaneous increase in the temperature occurs. Two hours later, 3.6 gms. of chromium acetylacetonate are added. Agitation of the autoclave is continued for 10 hours, the temperature being maintained between 80 and 90° C.

Proceeding as in the foregoing examples, a solid crystalline polymer is obtained in low yield.

EXAMPLE XIV

A solution of 8.2 gms. of diethyl zinc in 100 ml. of n-heptane is introduced under nitrogen into a 435 ml. autoclave. 115 gms. of propylene are then introduced and the whole is heated, with agitation, to 62° C. At this temperature, a soltuion of 3.8 gms. of titanium tetrachloride in 20 ml. of n-heptane is injected into the autoclave. The autoclave is agitated for about 10 hours at 60–70° C., after which the unreacted gases are vented, methanol is pumped in, and the reaction product is discharged. The crude polymer is purified as in Example I, using ether and hydrochloric acid with heating, and the polymer is then completely coagulated by treatment with methanol.

After filtering off the coagulated polymer and vacuum drying it under heating, 16 gms. of polypropylene are obtained. This mixture of polymers is then subjected to hot solvent extraction.

The acetone extracted fraction (A) consisting of oily, low molecular weight products, amounts to 41% of the total polymer.

The ether extracted fraction (B) amounting to 20% of the total polymer consists of an amorphous product having an intrinsic viscosity of 0.23.

The heptane-extracted fraction (C), also amounting to 20% of the total polymer, consists of a partially crystalline solid of intrinsic viscosity 0.41

The fraction (D) remaining after the solvents extractions amounts to 19.45% of the total polymer obtained and consists of a highly crystalline solid of intrinsic viscosity 1.22.

EXAMPLE XV

A solution of 5.7 gms. of triethyl aluminum in 50 ml. of n-heptane is introduced under nitrogen into a 435 ml. autoclave previously evacuated. 118 gms. of propylene are then introduced into the autoclave and the latter is heated, while agitated, to a temperature of 80° C. At this temperature, a solution of 4.3 gms. of vanadium tetrachloride in 50 ml. of n-heptane is injected into the autoclave under nitrogen pressure. The autoclave is agitated at 80° C.–83° C. and when the reaction is complete, methanol is pumped in. The polymeric material obtained is purified as in preceding example. 77 gms. of solid mixed polypropylenes of different molecular weights being obtained. The mixture is fractionated by extraction with hot acetone, ether, and n-heptane in that order.

The acetone-extracted fraction (A) amounting to 10% of the total polymer mix consists of oily, low molecular weight products.

The ether-extracted fraction (B) amounting to 45.2% of the initial polymer mixture consists of a rubbery, amorphous solid having, in tetralin solution at 135° C., an intrinsic viscosity of 0.82 corresponding to a molecular weight of about 24,000.

The heptane-extracted fraction (C) amounts to 16.4% of the total polymer and consists of a partially crystalline solid of intrinsic viscosity 1.31 corresponding to a molecular weight of about 48,000.

The residue of the n-heptane extraction (Fraction D) amounts to 28.2% of the polymer mixture and consists of a highly crystalline solid having an intrinsic viscosity equal to 1.88, corresponding to a molecular weight of about 85,000.

EXAMPLE XVI

Two steel balls, a glass vial containing 13 gms. of titanium tetrabromide and a solution of 11.4 gms. of triethyl aluminum in 500 ml. of n-heptane are introduced under nitrogen into an unagitated autoclave of 1750 ml. capacity, provided with means for oscillating the same. The autoclave is then heated, while still in motionless condition, to 63° C., and 280 gms. of propylene are introduced. Oscillation of the autoclave is then commenced and the glass vial breaks. The temperature rises spontaneously in a short time to 97° C. and then drops back to 85° C. Agitation of the autoclave at 85° C. is continued for about 10 hours, after which the unreacted gases are vented and methanol is pumped in to coagulate the polymer.

The polypropylene obtained, which is a mixture of polymers, is purified in the usual way, to obtain 249 gms. of the pure polymer equal to a conversion of 89% of the monomer employed. The mixed polymers comprising this initial polymeric product are then separated by fractional dissolution.

The acetone extract (15.1%) consists of oily products.

The ether-extracted fraction, A (33%), is a rubbery amorphous solid having an intrinsic viscosity of 0.53.

The heptane-extracted fraction, B (22.1%), consists of a partially crystalline solid having an intrinsic viscosity equal to 0.65.

The insoluble residue (Fraction D) corresponds to 30.8% of the total polymer obtained and consist of a highly crystalline solid having, in tetralin solutions at 135° C., an intrinsic viscosity of 1.78.

EXAMPLE XVII

Two steel balls, a glass vial containing 17 gms. of titanium tetraiodide and a solution of 11.4 gms. of triethyl aluminum in 500 ml. of heptane are introduced into an unagitated oscillatory autoclave of 2080 ml. capacity. The autoclave is heated to 71° C. and at this temperature 150 gms. of propylene are introduced. Oscillation of the autoclave is started, and the vial is broken. The temperature rises spontaneously in a short time to 100° C. and then drops back to 90° C. The autoclave is kept in motion for about 6 hours, after which the unreacted gases are vented. The polymeric product is coagulated and worked up as in preceding examples. 184 gms. of a mixture of polymers of propylene are thus obtained. The mixture is separated into the respective fractions comprising its extraction with hot acetone, ether, and n-heptane.

The acetone-extracted fraction A (20.4%) consists of oily low molecular weight products.

The ether-extracted fraction B (22.7%) consists of an amorphous solid having, in tetralin salution at 135° C. an intrinsic viscosity of 0.43.

The heptane-extracted fraction C (22%) consists of a partially crystalline solid having intrinsic viscosity 0.73.

The residue (Fraction D) amounting to 35% of the polymeric mix obtained as initial polymerization product, is a powdery, highly crystalline solid having an intrinsic viscosity of 2.16.

EXAMPLE XVIII

Two steel balls, a glass vial containing 4.7 gms. of zirconium tetrachloride, and a solution of 5.7 gms. of triethyl aluminum in 100 ml. of n-heptane are introduced under nitrogen into a 435 ml. autoclave adapted for oscillation. The autoclave is heated, while being held motionless, to a temperature of 79° C. at which temperature 106 gms. of propylene are injected into the autoclave. Soon afterwards the autoclave is set into motion to break the glass vial, and is agitated for 15 hours at 80–85° C. while polymerization takes place. Methanol is then pumped in, and the coagulated polymerization product is discharged and purified as in the preceding examples. About 22 gms. of mixed polypropylenes are thus isolated. The mixture is fractionated by treatment with hot solvents as described.

The acetone-extracted fraction A (60.4%) consists of semi-solid low molecular weight products.

The ether-extracted fraction B (11.6%) is an amorphous solid of intrinsic viscosity 0.49.

The heptane-extracted fraction C (13.85%) is a partially crystalline solid having an intrinsic viscosity of 0.94.

The insoluble residue (Fraction D) amounts to 14.3% of the total polymer mix and is a highly crystalline solid having an intrinsic viscosity of 2.0.

As will be apparent from the examples, the invention is not limited to propylene polymers. Polymers of the other unsaturated hydrocarbons embraced by the formula $CH_2=CHR$ have been produced. In the formula $CH_2=CHR$ for the unsaturated hydrocarbon R may have a total of from 1 to 16 carbon atoms. Also copolymers of the alpha-olefines with each other and with other monomers copolymerizable therewith may be obtained.

The polymers of the alpha-olefines other than propylene are, initially, also mixtures of amorphous and crystalline polymers which can be separated as described for the mixtures of propylene polymers. Because of the different solubilities of the polymerized alpha-olefines in organic solvents (see Table 2), different solvents are selected for use in fractionating the different polymerizates.

Filaments of the crystalline polymers other than polypropylene can be obtained in the same manner as described for the propylene polymers.

In general, when the alpha-olefines are polymerized in the presence of small amounts of other olefines or of a diolefine containing a vinyl group, the high polymers obtained have a certain crystallinity similar to that of an alpha-olefine homopolymer.

It will be evident from the foregoing that this invention provides wholly new polymers of the higher homologues of ethylene and of styrene which have, depending on their exact composition and molecular weights, widely varying properties which adapt them to a variety of uses in the plastic materials and elastomer arts.

Since some changes and modifications in the specific details given in the examples may be made in carrying out the invention, it is to be understood that it is not intended to limit the invention except as defined in the appended claims.

What is claimed is:

1. Normally solid polypropylene, consisting essentially of recurring propylene units, having a substantial crystalline polypropylene content.

2. Normally solid polypropylene as defined in claim 1 wherein said propylene units are substantially in head-to-tail enchainment and having a viscosity-average molecular weight above about 20,000.

3. Normally solid polypropylene as defined in claim 1 and having an average molecular weight above about 20,000.

4. Normally solid polypropylene consisting essentially of recurring propylene units which are in substantially head-to-tail enchainment, said polypropylene having a viscosity-average molecular weight above about 20,000 and having a substantial crystalline polypropylene content due to sequences of asymmetric carbon atoms having a regular steric arrangement along the main macromolecular chain.

References Cited

UNITED STATES PATENTS

| | | | |
|---|---|---|---|
| 1,908,549 | 5/1933 | Smith | 260—93.5 S |
| 2,387,784 | 10/1945 | Thomas | 260—93.7 |
| 2,420,565 | 5/1947 | Rugeley | 260—DIG. 23 |
| 2,691,647 | 10/1954 | Field et al. | 260—88.1 A |

FOREIGN PATENTS

| | | | |
|---|---|---|---|
| 538,782 | 6/1955 | Belgium | 260—93.7 |

OTHER REFERENCES

Natta et al., Journal American Chem. Society 77, 1708-10, (March 1955).

JOSEPH L. SCHOFER, Primary Examiner

U.S. Cl. X.R.

260—94.9 B, 88.2 R (1)

UNITED STATES PATENT OFFICE
CERTIFICATE OF CORRECTION

Patent No. 3,715,344            Dated February 6, 1973

Inventor(s) Guilio Natta, Piero Pino and Giorgio Mazzanti

It is certified that error appears in the above-identified patent and that said Letters Patent are hereby corrected as shown below:

Col. 1, line 32, the words "Pat No. 2,446,869" are cancelled and the word - - -abandoned- - - is substituted.

Col. 3, the model shown between lines 40 and 50 is corrected to appear as follows:

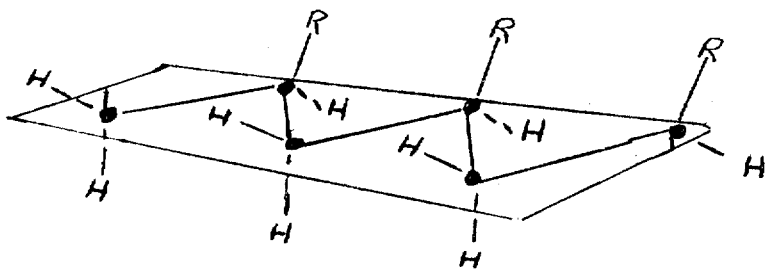

Col. 4, line 1, the period after "groups" is cancelled; a period is shown after "R", and "in" is corrected to - - -In- - -;

line 21, "indentifying" is corrected to - - -identifying- - -.

Col. 5, line 8, "weight" is corrected to - - -weights- - -.

FORM PO-1050 (10-69)

UNITED STATES PATENT OFFICE
CERTIFICATE OF CORRECTION (2)

Patent No. 3,715,344            Dated February 6, 1973

Inventor(s) Guilio Natta, Piero Pino and Giorgio Mazzanti

It is certified that error appears in the above-identified patent and that said Letters Patent are hereby corrected as shown below:

Col. 6, the material appearing between lines 69 and 71, is corrected to:

$$- - - \text{limit} \frac{\eta \text{ spec}}{C}$$
$$C \rightarrow O$$

where C is the concentration of the solution in gms/cc. - - -.

Col. 8, line 6, "700" is corrected to - - -700%- - -;

line 15, "40" is corrected to - - -40%- - -.

Col. 12, line 4 of Example XII, "71°C" is corrected to - - -70°C- - -.

Col. 14, line 14, "consist" is corrected to - - -consists- - -.

Col. 16, claim 3 is cancelled and the number of the next succeeding claim is corrected from "4" to - - -3- - -.

Signed and sealed this 26th day of March 1974.

(SEAL)
Attest:

EDWARD M. FLETCHER, JR.          C. MARSHALL DANN
Attesting Officer                   Commissioner of Patents